US012806710B2

(12) United States Patent
Takeoka et al.

(10) Patent No.: US 12,806,710 B2
(45) Date of Patent: Nov. 24, 2026

(54) FRICTION-STIR SPOT WELDING DEVICE AND METHOD FOR OPERATING SAME

(71) Applicant: KAWASAKI JUKOGYO KABUSHIKI KAISHA, Kobe (JP)

(72) Inventors: Naoki Takeoka, Kobe (JP); Ryoji Ohashi, Kobe (JP); Shuhei Yoshikawa, Kobe (JP); Masahiro Miyake, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/836,444

(22) PCT Filed: Feb. 15, 2023

(86) PCT No.: PCT/JP2023/005117
§ 371 (c)(1),
(2) Date: Aug. 7, 2024

(87) PCT Pub. No.: WO2023/157856
PCT Pub. Date: Aug. 24, 2023

(65) Prior Publication Data

US 2025/0144740 A1 May 8, 2025

(30) Foreign Application Priority Data

Feb. 16, 2022 (JP) ................................ 2022-022265

(51) Int. Cl.
*B23K 20/00* (2006.01)
*B23K 20/12* (2006.01)

(52) U.S. Cl.
CPC .......... *B23K 20/123* (2013.01); *B23K 20/125* (2013.01); *B23K 20/1265* (2013.01)

(58) Field of Classification Search
CPC .............. B23K 20/1255; B23K 20/125; B23K 20/122; B23K 20/126; B23K 20/26;
(Continued)

(56) References Cited

U.S. PATENT DOCUMENTS 689,516 A * 12/1901 Rattek .................. E21B 19/086 173/132
RE17,838 E * 10/1930 Gayman .............. F16C 35/073 384/537
(Continued)

FOREIGN PATENT DOCUMENTS

EP 3 804 900 A1 4/2021
JP 2007-029979 A 2/2007

OTHER PUBLICATIONS

Computer English Translation of JP-2008036664-A (Year: 2008).*
(Continued)

*Primary Examiner* — Erin B Saad
(74) *Attorney, Agent, or Firm* — Oliff PLC

(57) ABSTRACT

A friction-stir spot welding device includes a friction-stir spot welding tool including a pin, a shoulder having a hollow part into which the pin is inserted, and an oil agent interposed in an interlayer between an outer peripheral surface of the pin and an inner peripheral surface of the shoulder; and a control unit of the tool. The control unit executes first operation control of relatively moving the pin with respect to the shoulder in a state where the oil agent is held in the interlayer, and second operation control of relatively moving the pin with respect to the shoulder so that the oil agent is discharged from the interlayer to outside through a tip opening of the hollow part.

12 Claims, 8 Drawing Sheets

(58) Field of Classification Search
CPC .. B23K 20/12; B23K 20/123; B23K 20/1245; B23K 20/1265; B23K 20/129; B23K 2101/04; B23K 2101/18; B23K 2103/10; B23K 9/328
See application file for complete search history.

(56) References Cited

U.S. PATENT DOCUMENTS

| | | | | |
|---|---|---|---|---|
| 4,591,300 | A * | 5/1986 | Weiblen | B23B 41/02 227/27 |
| 6,138,895 | A * | 10/2000 | Oelgoetz | B23K 20/125 228/2.1 |
| 7,677,427 | B2 * | 3/2010 | Fukuhara | B23K 20/125 228/2.1 |
| 10,022,817 | B2 * | 7/2018 | Maruko | B23K 20/1255 |
| 10,279,422 | B2 * | 5/2019 | Werz | B23K 20/1255 |
| 2005/0045694 | A1 * | 3/2005 | Subramanian | B23K 37/06 228/112.1 |
| 2005/0045695 | A1 * | 3/2005 | Subramanian | B23K 20/125 228/112.1 |
| 2005/0092817 | A1 * | 5/2005 | Baumann | B25B 5/00 228/212 |
| 2008/0099533 | A1 * | 5/2008 | Hanlon | B23K 20/126 228/112.1 |
| 2008/0217377 | A1 * | 9/2008 | Stol | B23K 20/1255 228/2.3 |
| 2014/0029882 | A1 * | 1/2014 | Palmer | F16C 33/6685 384/473 |
| 2014/0069986 | A1 * | 3/2014 | Okada | B23K 20/125 228/2.1 |
| 2014/0217151 | A1 * | 8/2014 | Miyahara | B23B 31/11 228/2.1 |
| 2015/0273623 | A1 * | 10/2015 | Kato | B23K 20/126 269/296 |
| 2016/0221116 | A1 * | 8/2016 | Kato | B23K 20/126 |
| 2017/0304935 | A1 * | 10/2017 | Okada | B23K 20/22 |
| 2017/0312850 | A1 * | 11/2017 | Werz | B23K 20/1255 |
| 2019/0143442 | A1 * | 5/2019 | Ohashi | B23K 11/16 428/172 |
| 2019/0262934 | A1 * | 8/2019 | Ohashi | B23K 20/12 |
| 2020/0206840 | A1 * | 7/2020 | Hirano | B23K 20/123 |
| 2021/0316391 | A1 * | 10/2021 | Miyake | B23K 20/1255 |
| 2022/0339734 | A1 * | 10/2022 | Miyake | B23K 20/125 |

OTHER PUBLICATIONS

Mar. 27, 2025 Extended Search Report issued in European Patent Application No. 23756381.2.

Apr. 11, 2023 International Search Report issued in International Patent Application No. PCT/JP2023/005117.

* cited by examiner

BLOWING DEVICE
10
10A
10B
10D
110
110T
120
120A
120T
7
8
9
25
27
F
S4
S5
58
59
61
62
62S
63
64
65
66
67
510
520
520S

FRICTION-STIR SPOT WELDING DEVICE AND METHOD FOR OPERATING SAME

TECHNICAL FIELD

The present disclosure relates to a friction-stir spot welding device including a pin and a shoulder, and a method for operating the friction-stir spot welding device.

BACKGROUND ART

As a method for overlapping and welding two or more members including a metal member, a fiber reinforced thermoplastic resin member, and the like, welding using friction stirring is known. For friction-stir welding, a friction-stir spot welding tool including a pin and a shoulder having a hollow part for accommodating the pin is sometimes used. For example, in a shoulder preceding process, the shoulder is projected and press-fitted into an overlapping portion of a member, while the pin is retracted to accommodate the material overflowing by the press-fitting.

Since a part of the tool is press-fitted into a member to be welded, powder of the member to be welded may be trapped inside the tool. As the number of welding points increases, an amount of powder being trapped also increases, and finally adheres to a surface of the pin and inhibits operation of the tool. Patent Literature 1 discloses a friction-stir spot welding device that executes cleaning operation of relatively projecting a pin processed into a special shape with respect to a shoulder or cleaning operation of bringing a brush into contact with the pin in order to remove adhesion to the pin.

The device of Patent Literature 1 requires a contrivance for a shape for cleaning a tool and a cleaning tool separately installed. For this reason, a structure of the friction-stir spot welding device is complicated.

CITATION LIST

Patent Literature

Patent Literature 1: JP 2007-29979 A

SUMMARY OF INVENTION

An object of the present disclosure is to provide a friction-stir spot welding device capable of preventing adhesion of a powder piece of a member to be welded to a tool without complicating a structure.

A friction-stir spot welding device according to an aspect of the present disclosure includes a friction-stir spot welding tool including a pin, a shoulder having a hollow part into which the pin is inserted, and an oil agent interposed in an interlayer between an outer peripheral surface of the pin and an inner peripheral surface of the shoulder, and a control unit of the tool, in which the control unit executes first operation control of relatively moving the pin with respect to the shoulder in a state where the oil agent is held in the interlayer, and second operation control of relatively moving the pin with respect to the shoulder so that the oil agent is discharged from the interlayer to outside through a tip opening of the hollow part.

A method for operating a friction-stir spot welding device according to another aspect of the present disclosure is a method for operating a friction-stir spot welding device including a pin, a shoulder having a hollow part into which the pin is inserted, and an oil agent interposed in an interlayer between an outer peripheral surface of the pin and an inner peripheral surface of the shoulder, the method including relatively moving the pin with respect to the shoulder in a state where the oil agent is held in the interlayer when friction-stir welding is performed, and relatively moving the pin with respect to the shoulder so that the oil agent is discharged from the interlayer to outside through a tip opening of the hollow part when the oil agent is discharged from the interlayer.

According to the present disclosure, it is possible to provide a friction-stir spot welding device capable of preventing adhesion of a powder piece of a member to be welded to a tool without complicating a structure.

DESCRIPTION OF EMBODIMENTS

Hereinafter, embodiments of the present disclosure will be described in detail with reference to the drawings. The friction-stir spot welding device according to the present disclosure can be applied to manufacturing of various welded bodies obtained by overlapping two or more structural members such as a plate made from metal or resin, a frame, an exterior member, or a columnar member and performing spot welding. The welded body to be manufactured is a constituent member of a structure such as an aircraft, a railway vehicle, or an automobile.

[Configuration of Friction-Stir Spot Welding Device]

Figure 1:
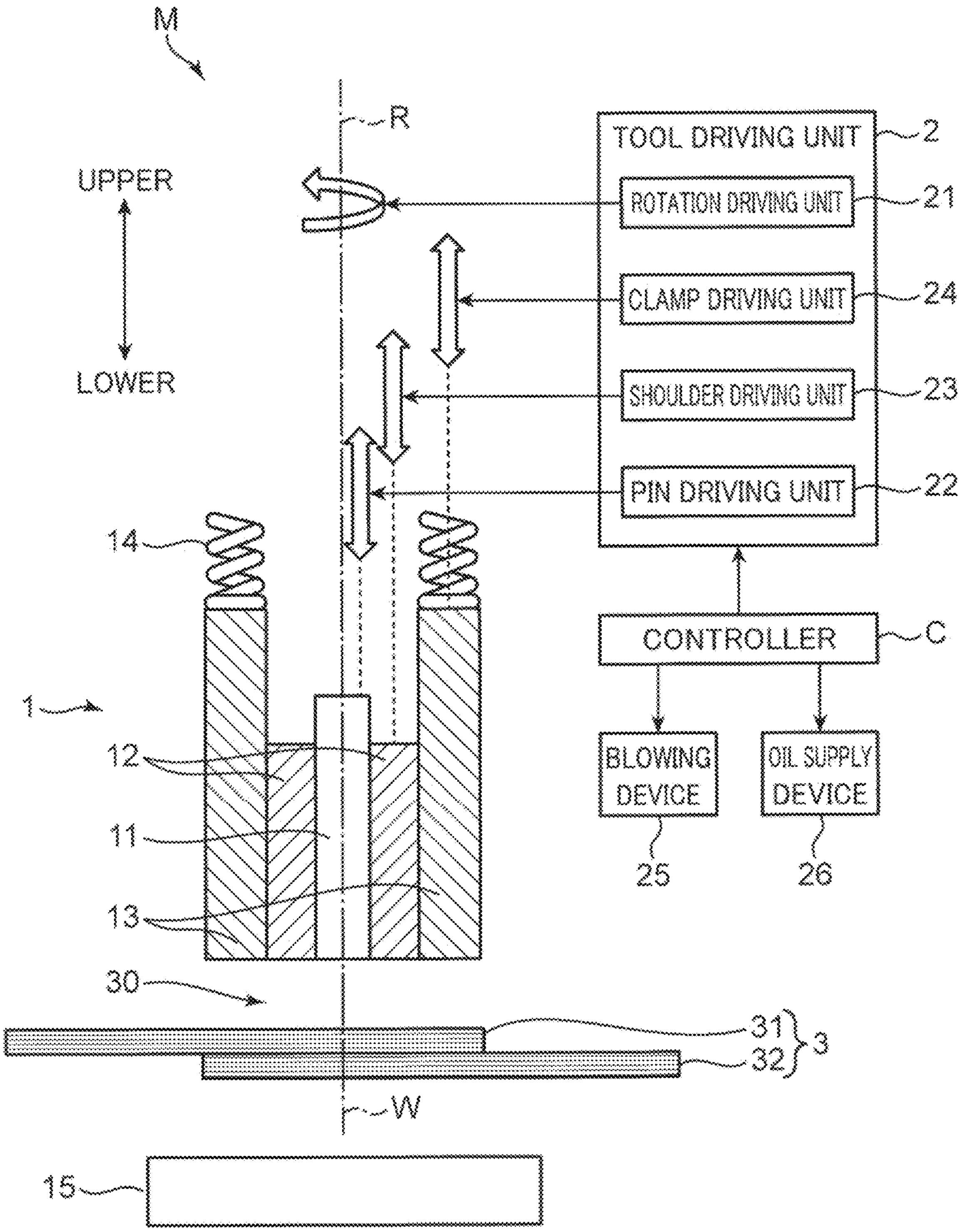
FIG. 1 is a schematic diagram illustrating a configuration of a friction-stir spot welding device according to an embodiment of the present disclosure.

FIG. 1 is a schematic view illustrating a configuration of a friction-stir spot welding device M according to an embodiment of the present disclosure. The friction-stir spot welding device M includes a friction-stir spot welding tool 1, a tool driving unit 2 that rotates and drives the tool 1 to move up and down, a blowing device 25 that supplies airflow to the tool 1, an oil supply device 26 that supplies an oil agent to the tool 1, and a controller C (a control unit of the tool) that controls operation of each unit of the friction-stir spot welding device M. Note that, in FIG. 1, directions “up” and “down” are indicated for convenience of description, and are not intended to limit an actual use direction of the tool 1.

The tool 1 is supported by various tool fixing portions. For example, the tool fixing portion is a tip portion of an articulated robot. A backup 15 is arranged facing a lower end surface of the tool 1. At least two members to be welded are arranged between the tool 1 and the backup 15. FIG. 1 illustrates an example in which an overlapping portion 30 in which a part of a first member 31 including a flat plate and a part of a second member 32 similarly including a flat plate overlap each other in a vertical direction is arranged between the tool 1 and the backup 15.

The tool 1 includes a pin 11, a shoulder 12, a clamp 13, and a spring 14. The pin 11 is a member formed in a columnar shape, and is arranged such that its axis extends in the vertical direction. The pin 11 is rotatable about the axis as a rotation axis R, and is movable forward and backward in the vertical direction along the rotation axis R. Note that when the tool 1 is used, the rotation axis R and a spot welding position W in the overlapping portion 30 are aligned.

The shoulder 12 is a member formed in a cylindrical shape having a hollow part through which the pin 11 is inserted. An axis of the shoulder 12 is coaxial with the axis of the pin 11, that is, the rotation axis R. The shoulder 12 can rotate about the rotation axis R and can move forward and backward in the vertical direction along the rotation axis R. As will be described in detail later, in the present embodiment, an oil agent that enhances lubricity and prevents attachment of adhesion is interposed in an interlayer between an outer peripheral surface of the pin 11 and an inner peripheral surface of the shoulder 12.

The tool 1 of the present embodiment is a double-acting tool in which the pin 11 and the shoulder 12 move independently in an axial direction. That is, both the shoulder 12 and the pin 11 inserted into the hollow part can relatively move in the rotation axis R direction while rotating about the rotation axis R. Specifically, the pin 11 and the shoulder 12 can not only move up and down simultaneously along the rotation axis R, but also independently move so that one moves up and the other moves down.

The clamp 13 includes a hollow part into which the shoulder 12 is inserted, and is a member formed in a cylindrical shape. An axis of the clamp 13 is also coaxial with the rotation axis R. The clamp 13 does not rotate about the axis, but moves up and down, that is, moves forward and backward in the vertical direction along the rotation axis R. The clamp 13 serves to surround an outer periphery of the pin 11 or the shoulder 12 when the pin 11 or the shoulder 12 performs friction stir. By surrounding of the clamp 13, a friction-stir spot welding portion can be finished smoothly without scattering a friction stir material.

The spring 14 is attached to the upper end side of the clamp 13 and biases the clamp 13 downward toward the overlapping portion 30. The clamp 13 is attached to the tool fixing portion with the spring 14 interposed between them. The backup 15 includes a flat surface that abuts on the lower surface side of the overlapping portion 30 to be welded. The backup 15 is a backing member that supports the overlapping portion 30 when the pin 11 or the shoulder 12 is press-fitted into the overlapping portion 30. The clamp 13 biased by the spring 14 presses the overlapping portion 30 against the backup 15.

The tool driving unit 2 includes a rotation driving unit 21, a pin driving unit 22, a shoulder driving unit 23, and a clamp driving unit 24. The rotation driving unit 21 includes a motor, a driving gear, and the like, and rotatably drives the pin 11 and the shoulder 12 about the rotation axis R. The pin driving unit 22 is a mechanism that moves the pin 11 forward and backward along the rotation axis R. The pin driving unit 22 drives the pin 11 so that the pin 11 is press-fitted into the overlapping portion 30 and retracted from the overlapping portion 30. The shoulder driving unit 23 is a mechanism that moves the shoulder 12 forward and backward along the rotation axis R, and causes the shoulder 12 to be press-fitted into and retracted from the overlapping portion 30. The clamp driving unit 24 is a mechanism that moves the clamp 13 forward and backward along the rotation axis R. The clamp driving unit 24 moves the clamp 13 toward the overlapping portion 30 and presses the overlapping portion 30 against the backup 15. At this time, biasing force of the spring 14 acts.

The blowing device 25 generates airflow and supplies the airflow to the interlayer between the pin 11 and the shoulder 12. As the blowing device 25, a device capable of generating high-pressure airflow is desirable, and for example, an axial blowing device including a multiblade fan or a turbo fan can be used.

The oil supply device 26 supplies an oil agent in the interlayer between the pin 11 and the shoulder 12. The oil supply device 26 includes, for example, a tank that stores the oil agent and a pump that pumps the oil agent. As the oil agent, a liquid or grease oil agent having an effect of preventing metal adhesion can be used. For example, lubricating oil base oil, mineral oil or synthetic oil containing petroleum-based hydrocarbon as a main component, or the like can be used as the oil agent. Further, molybdenum, graphite or solid paraffin may be used as the oil agent. Mineral oil, synthetic oil, or the like to which metal powder is added as a solid lubricant may be used as the oil agent.

The controller C includes a microcomputer or the like, and executes a predetermined control program to control operation of the tool driving unit 2, the blowing device 25, and the oil supply device 26. Specifically, the controller C controls the rotation driving unit 21 to perform required rotation operation of the pin 11 and the shoulder 12. Further, the controller C controls the pin driving unit 22, the shoulder driving unit 23, and the clamp driving unit 24 to perform required forward and backward movement operation of the pin 11, the shoulder 12, and the clamp 13. Furthermore, the controller C controls operations of the blowing device 25 and the oil supply device 26 to control blowing operation and oil supply operation with respect to the tool 1.

[Method for Using Tool]

Next, a method for using the tool 1 exemplified in the present embodiment will be described. As a method for using the friction-stir spot welding device M, there are roughly a pin preceding process of first press-fitting the pin 11 of the tool 1 into an overlapping portion of a welding member and a shoulder preceding process of first press-fitting the shoulder 12 into an overlapping portion of a welding member. Among them, in the present embodiment, a shoulder preceding process is employed.

Figure 2:
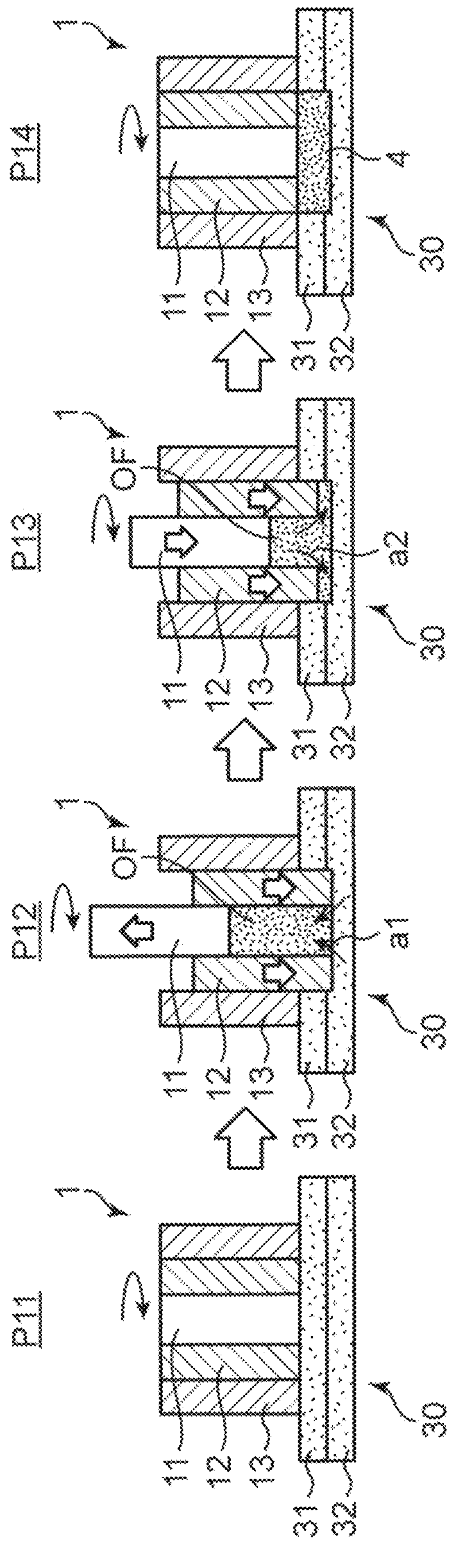
FIG. 2 is a diagram illustrating an example of a welding method using the friction-stir spot welding device.

FIG. 2 is a diagram illustrating processes P11 to P14 of a friction-stir spot welding method according to the shoulder preceding process. The processes P11 to P14 schematically illustrate a situation of friction-stir spot welding of the overlapping portion 30 of the first member 31 and the second member 32. The process P11 illustrates a pre-heating step of the overlapping portion 30. The controller C rotates the pin 11 and the shoulder 12 around the axis at a predetermined rotation speed in a state where a lower end of the tool 1 abuts against a surface of the first member 31.

The process P12 illustrates a press-fitting step of the shoulder 12. In this press-fitting step, the controller C moves down the shoulder 12 to press-fit the shoulder 12 into the overlapping portion 30, and retracts the pin 11 upward. With this operation, a material of a press-fitting region of the shoulder 12 is stirred. Further, an overflow material OF overflowing from the overlapping portion 30 by the press fitting is released to a hollow space of the shoulder 12 generated by retraction of the pin 11 (see an arrow a1). As described above, in the present embodiment, the pin 11 is relatively moved upward with respect to the shoulder 12 at the time of friction-stir welding.

The process P13 illustrates a backfilling step of the overflow material OF. In the backfilling step, the controller C moves up and retracts the shoulder 12 and moves down the pin 11. As the pin 11 moves down, as indicated by an arrow a2, a press-fitting region of the shoulder 12 is backfilled with the overflow material OF released into the hollow space. The process P14 illustrates a leveling step. In a state where lower end surfaces of the pin 11 and the shoulder 12 are returned to a height position of a surface of the first member 31, both are rotated to smooth a spot welding portion. By the above process, the stirred and welded portion 4 is formed.

The friction-stir spot welding device M of the present embodiment is suitable for welding metal materials. As an example, an upper plate of the overlapping portion 30, that is, the first member 31 on the side where the tool 1 is press-fitted is made from an aluminum alloy, and the second member 32 of a lower plate is made from high-tensile steel. When friction-stir welding is performed by press-fitting the tool 1 into an upper plate with respect to the overlapping portion 30 of the metal materials, a metal powder piece generated at the time of press-fitting, an aluminum powder piece in the above example, is inevitably trapped in the tool 1. By trapping of the powder piece, an operation load of the tool 1 becomes high, and malfunction of the tool 1 may occur.

The above problem can be alleviated by interposing an oil agent having lubricity in the interlayer between the pin 11 and the shoulder 12. That is, by interposing the oil agent, it is possible to prevent intrusion itself of a powder piece derived from the press-fitting of the tool 1 into the interlayer, such as the aluminum powder piece described above. Further, adhesion of the powder piece to an outer peripheral surface of the pin 11 can also be prevented by a lubricating effect of the oil agent. However, it has been found that when the number of welding points by the tool 1 exceeds several tens of thousands of times, powder pieces start to be deposited in the oil agent in the interlayer. As deposition of the powder pieces progresses, an agglomerated piece having a relatively large volume is formed, and the agglomerated piece is pressed and adhered to an outer peripheral surface of the pin 11, which may cause malfunction of the tool 1. The friction-stir spot welding device M of the present embodiment has a characteristic of being able to prevent adhesion of the powder piece. Hereinafter, a configuration for realizing this characteristic will be described.

First Embodiment of Tool

The tool 1 of the present embodiment executes operation (first operation control) of performing friction welding by relatively moving the pin 11 with respect to the shoulder 12 in a state where an oil agent is held in an interlayer between the pin 11 and the shoulder 12, and operation (second operation control) of forcibly discharging an oil agent that may be contaminated by trapping of a powder piece from the interlayer. The pin 11 and the shoulder 12 have a contrivance for a shape capable of realizing these pieces of operation.

<Specific Shape of Tool>

Figure 3:
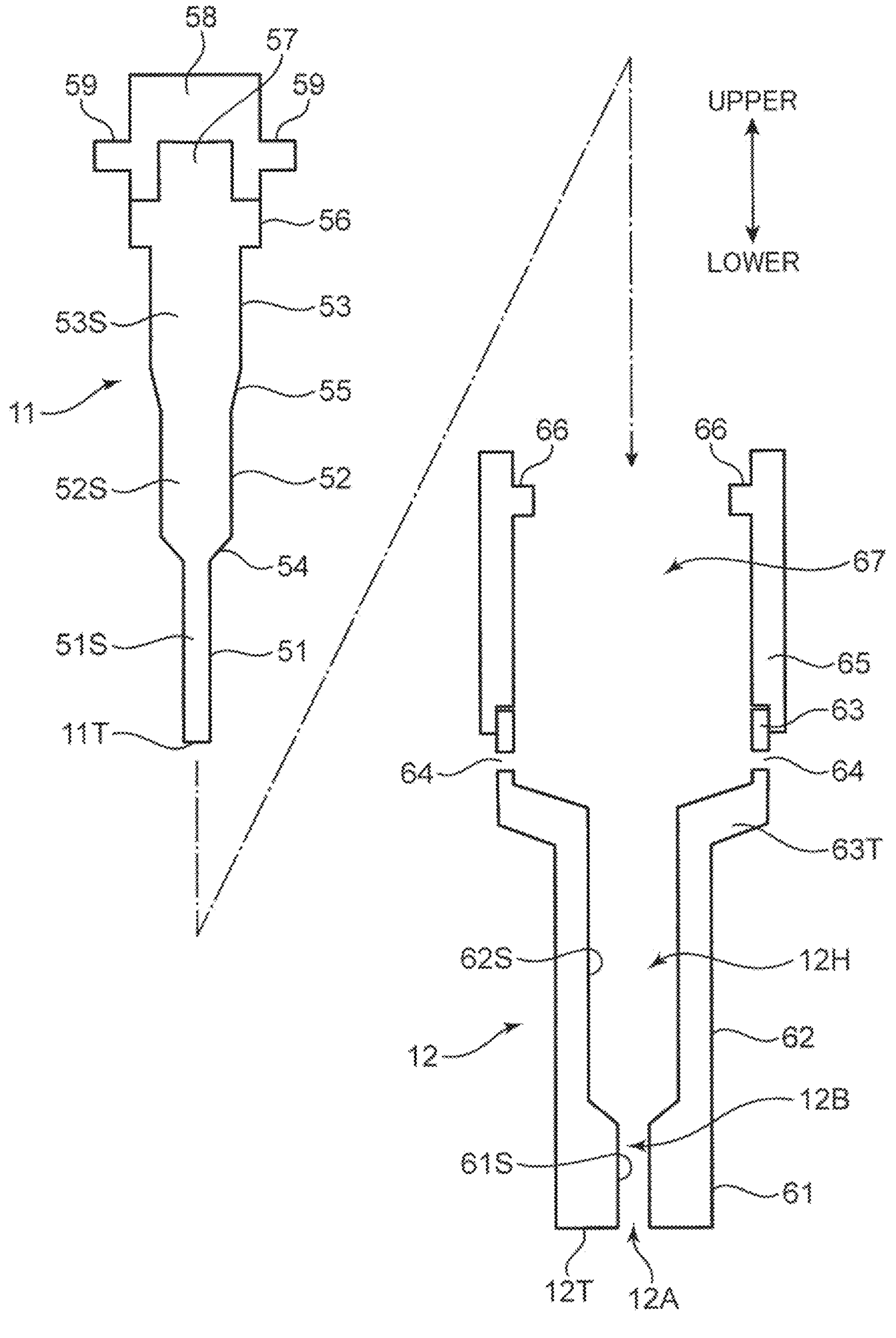
FIG. 3 is an exploded cross-sectional view of a tool according to a first embodiment included in the friction-stir spot welding device.

FIG. 3 is an exploded cross-sectional view of the pin 11 and the shoulder 12 of the tool 1 according to the first embodiment. The pin 11 is formed of a cylindrical body whose diameter gradually decreases toward a lower end portion 11T, and has a tip small diameter portion 51, a medium diameter portion 52, and a large diameter portion 53. The tip small diameter portion 51 is a portion having a smallest outer diameter forming a tip portion in the pin 11, and a tip surface of the tip small diameter portion 51 is the lower end portion 11T of the pin 11. The medium diameter portion 52 is a columnar portion located substantially in the middle in the axial direction of the pin 11 and having a larger diameter than the tip small diameter portion 51. An upper end of the tip small diameter portion 51 and a lower end of the medium diameter portion 52 are connected by a first tapered portion 54. Note that a region corresponding to the tip small diameter portion 51 and the medium diameter portion 52 may have the same diameter, and the first tapered portion 54 may be omitted.

The large diameter portion 53 is a columnar portion formed in an upper portion of the pin 11 and having a larger diameter than the medium diameter portion 52. An upper end of the medium diameter portion 52 and a lower end of the large diameter portion 53 are connected by a second tapered portion 55. A flange portion 56 having a larger diameter than the large diameter portion 53 is connected to an upper end of the large diameter portion 53, and an engagement portion 57 is connected to an upper end of the flange portion 56. A pin base 58 having a hollow part for fitting is fitted into the engagement portion 57. The pin base 58 is a part of a gun attached to a tip of a robot arm, for example. A lower end surface of the pin base 58 abuts on the flange portion 56. An annular projecting portion 59 (air seal portion) projecting outward in a radial direction is integrally formed on a side peripheral surface of the pin base 58.

The shoulder 12 is formed of a cylindrical body capable of accommodating the pin 11, and has a tip portion 61, an intermediate portion 62, a base end portion 63, and an introduction port 64. The tip portion 61 and the intermediate portion 62 have the same outer diameter, and the base end portion 63 has a larger diameter than these. A lower end of the base end portion 63 and an upper end of the intermediate portion 62 are connected by a tapered portion 63T.

The tip portion 61 is a portion forming a tip portion in the shoulder 12, and a tip surface of the tip portion 61 is a lower end portion 12T of the shoulder 12. A tip hollow part 12B of a columnar type having an inner diameter slightly larger than an outer diameter of the tip small diameter portion 51 of the pin 11 is formed inside the tip portion 61. The intermediate portion 62 is a portion continuing to the upper side of the tip portion 61, and has an intermediate hollow part 12H of a columnar type continuing to the tip hollow part 12B in the inside of the intermediate portion 62. An inner diameter of the intermediate hollow part 12H is larger than an outer diameter of the medium diameter portion 52 of the pin 11 by a predetermined diameter difference gap and slightly larger than the large diameter portion 53. The base end portion 63 is a cylindrical portion continuous with the upper side of the intermediate portion 62 with the tapered portion 63T interposed between them. In the base end portion 63, a plurality of introduction ports 64 penetrating a wall of the base end portion 63 in the radial direction are opened.

An upper end of the base end portion 63 is fitted into a shoulder base 65. The shoulder base 65 is also part of the gun, for example. The shoulder base 65 and the base end portion 63 define a supply chamber 67 that is a space sealed when airflow is supplied from the blowing device 25 into the tool 1. An annular ridge 66 (air seal portion) projecting inward in the radial direction is formed on an inner peripheral surface of the shoulder base 65. An inner diameter of the ridge 66 is slightly larger than an outer diameter of the annular projecting portion 59 of the pin base 58. A seal member is attached to an inner peripheral surface of the ridge 66 or an outer peripheral surface of the annular projecting portion 59. In a modified embodiment, one of the annular projecting portion 59 and the ridge 66 may have a projecting shape, and the other may be a surface on which the seal member only abuts.

Figure 4:
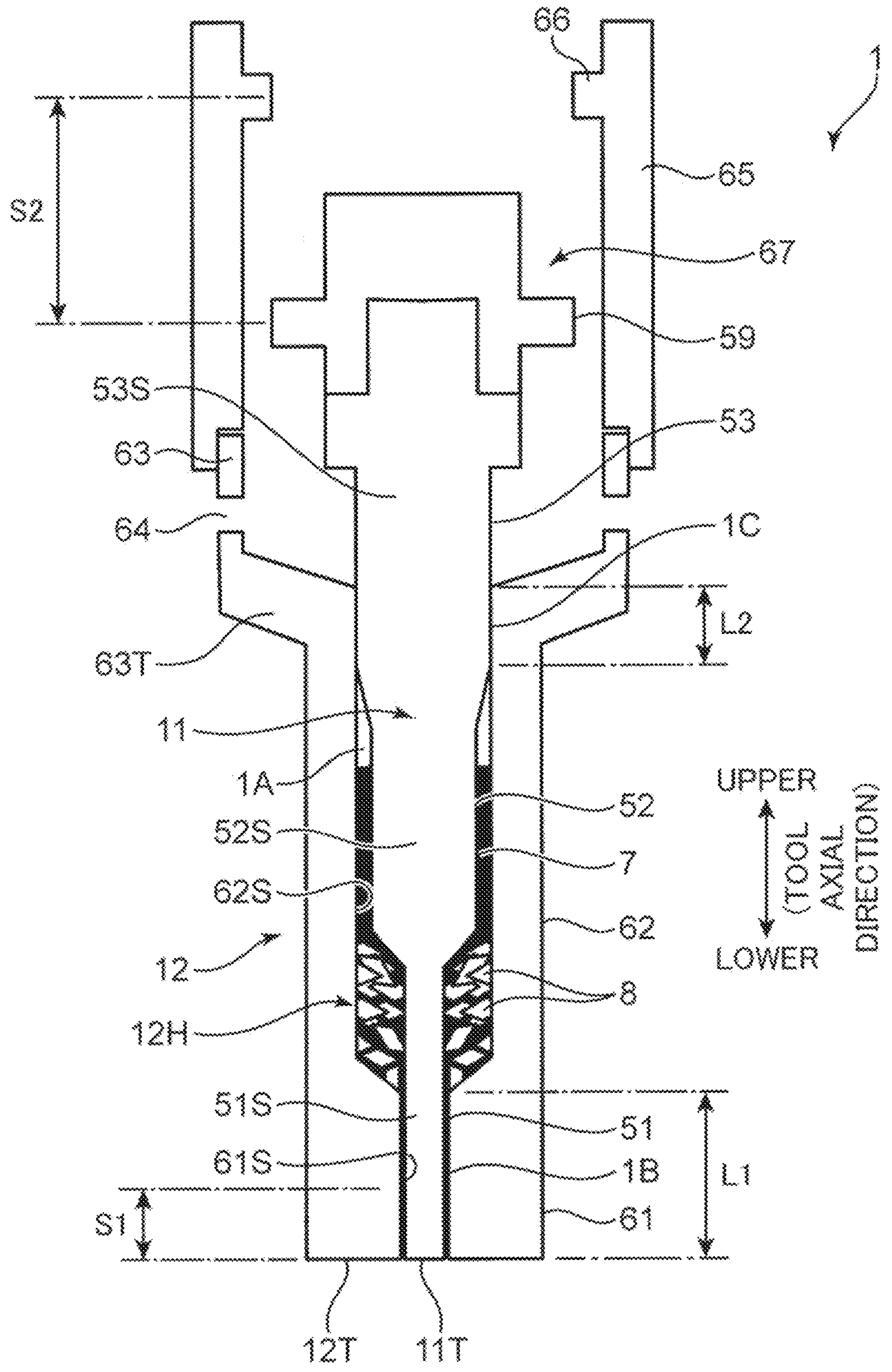
FIG. 4 is a cross-sectional view illustrating a state of the tool in a welding stage for performing friction-stir welding.

FIG. 4 is a cross-sectional view of the tool 1 of the first embodiment illustrating a state in which the pin 11 is attached to the shoulder 12. FIG. 4 illustrates a basic state of the tool 1 in which the lower end portion 11T of the pin 11 and the lower end portion 12T of the shoulder 12 are flush with each other. In this basic state, about the lower half of the tip small diameter portion 51 of the pin 11 enters the tip hollow part 12B of the shoulder 12. In other words, the tip small diameter portion 51 is inserted over the entire length in the axial direction of the tip hollow part 12B. The medium diameter portion 52 of the pin 11 is accommodated in the intermediate hollow part 12H of the shoulder 12 over the entire length in the axial direction. A lower portion of the large diameter portion 53 of the pin 11 is accommodated in the intermediate hollow part 12H, and an upper portion of the large diameter portion 53 projects to the supply chamber 67.

In the intermediate hollow part 12H, in an interlayer 1A between an intermediate outer peripheral surface 52S of the medium diameter portion 52 and a tip outer peripheral surface 51S of the tip small diameter portion 51 and an intermediate inner peripheral surface 62S of the intermediate portion 62, a gap based on a diameter difference between them exists. Specifically, a relatively small gap based on a diameter difference gap between the intermediate hollow part 12H and the medium diameter portion 52 is formed between the intermediate outer peripheral surface 52S and the intermediate inner peripheral surface 62S. Further, a relatively large gap is formed between the tip outer peripheral surface 51S and the intermediate inner peripheral surface 62S since the tip small diameter portion 51 has a small diameter. An oil agent 7 is interposed in the interlayer 1A so as to fill these gaps. The diameter difference gap is set to width capable of holding the oil agent 7 having predetermined viscosity in the interlayer 1A without causing the oil agent 7 to flow out.

The tool 1 includes a first seal portion 1B and a second seal portion 1C arranged so as to sandwich the interlayer 1A holding the oil agent 7 in the vertical direction, that is, in the axial direction of the tool 1. The first seal portion 1B is a seal portion formed by the tip outer peripheral surface 51S of the tip small diameter portion 51 of the pin 11 and a tip inner peripheral surface 61S of the tip portion 61 of the shoulder 12 facing each other with a clearance that does not substantially allow the oil agent 7 to pass through. Note that "not substantially allow . . . to pass through" means that the oil agent 7 may be allowed to pass through by using means such as applying high pressure, but the oil agent 7 does not leak in normal operation. The second seal portion 1C is a seal portion formed by allowing a base end outer peripheral surface 53S of the large diameter portion 53 of the pin 11 and the intermediate inner peripheral surface 62S of the shoulder 12 to face each other with a clearance that does not substantially allow the oil agent 7 to pass through. In a state where the first seal portion 1B and the second seal portion 1C are maintained, the oil agent 7 does not leak from the interlayer 1A.

In the basic state of the tool 1 illustrated in FIG. 4, the first seal portion 1B is formed with a first seal length L1 in the axial direction of the tool 1 from a tip opening 12A of the shoulder 12. In the present embodiment, the first seal length L1 corresponds to an axial length of the tip hollow part 12B in the tip portion 61. Note that the first seal length L1 is a section length in which the oil agent 7 can be sealed, and a substantial seal length of the first seal portion 1B becomes short when the pin 11 moves up. The second seal portion 1C is formed with a second seal length L2 (L2<L1) shorter than the first seal length L1 in the axial direction of the tool 1. That is, when the pin 11 is moved up as much as the second seal portion 1C is released, the first seal portion 1B can be maintained.

Figure 5:
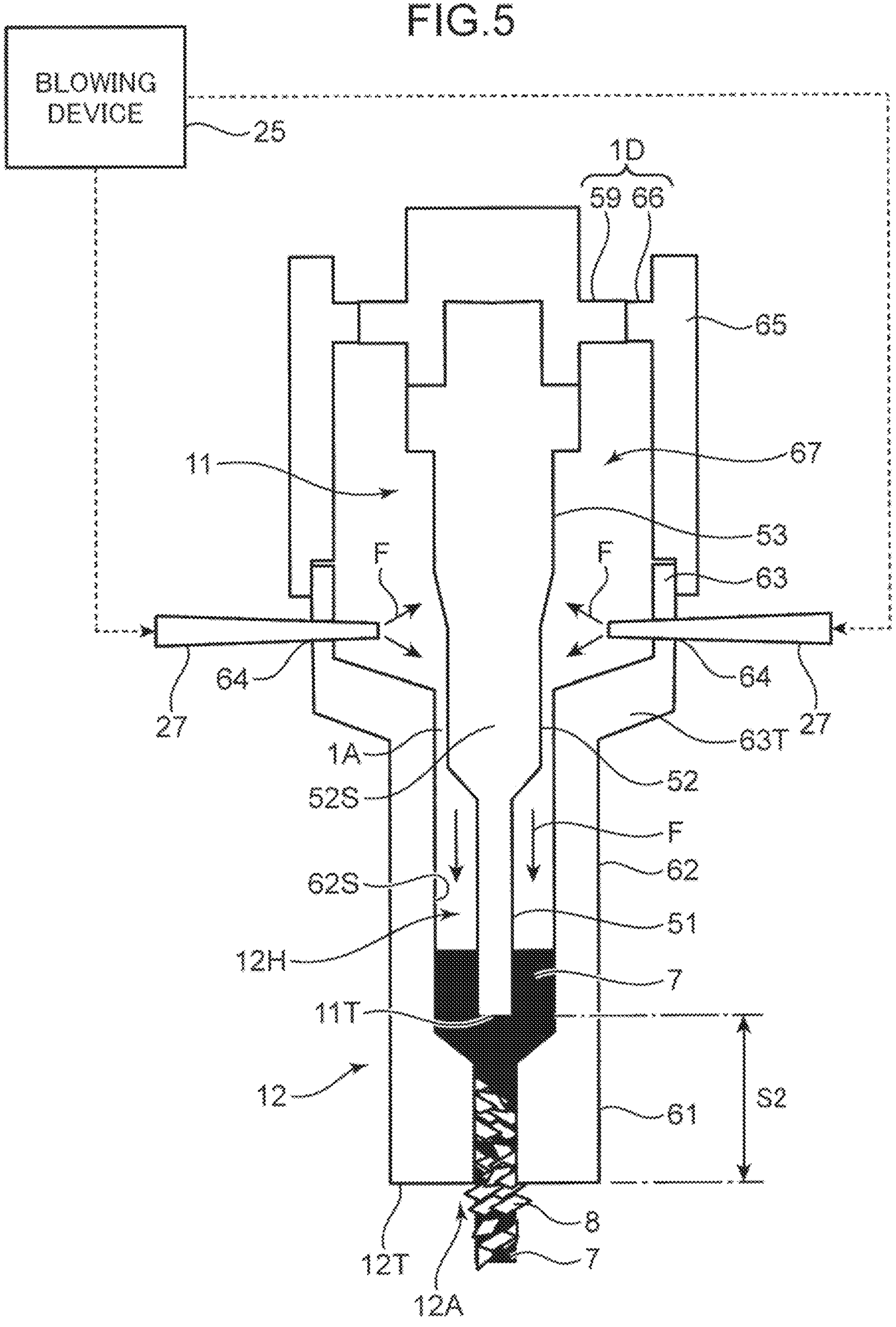
FIG. 5 is a cross-sectional view illustrating a state of the tool in a discharge stage for discharging an oil agent from the tool.
Figure 6:
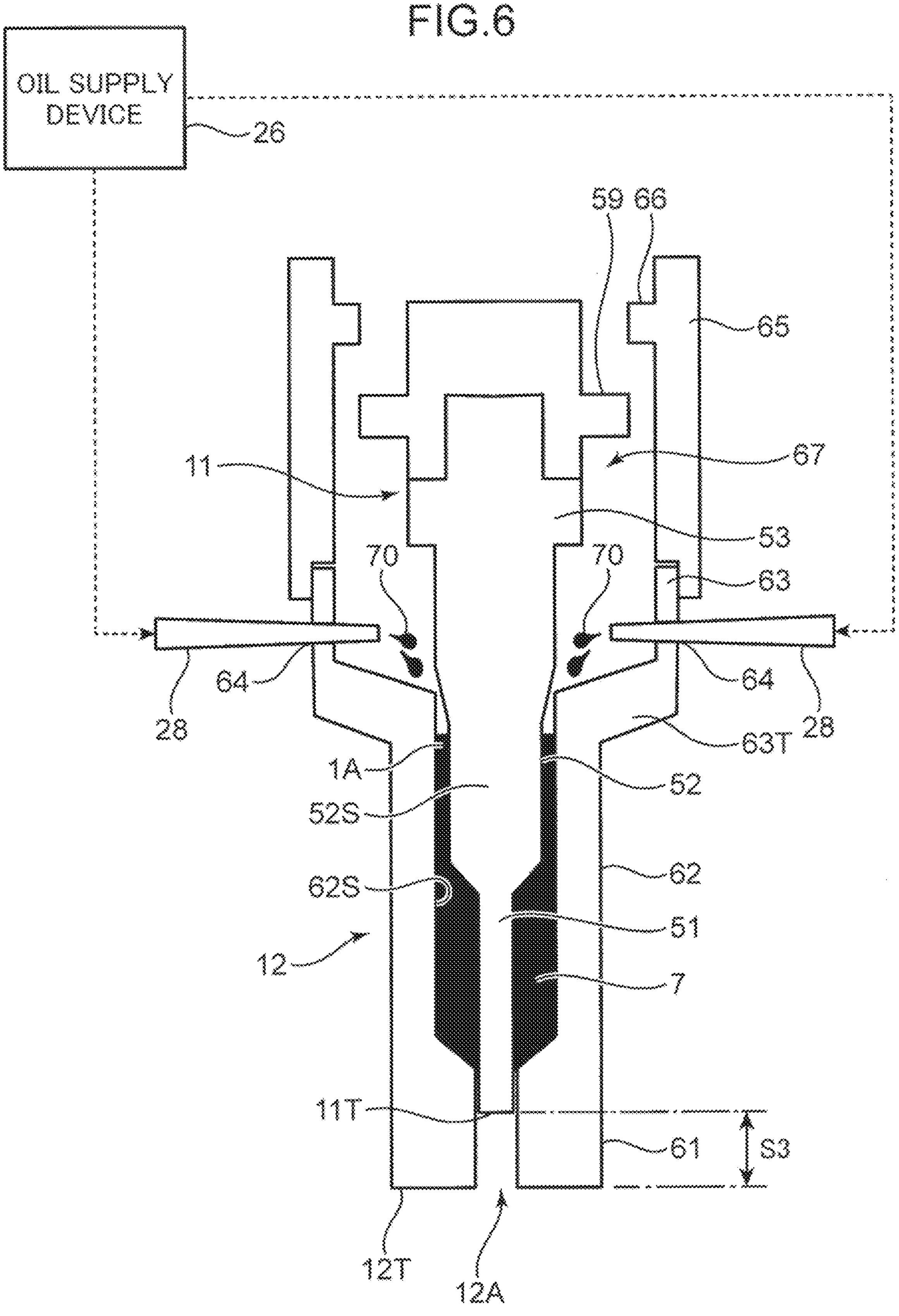
FIG. 6 is a cross-sectional view illustrating a state of the tool in an oil supply stage for supplying an oil agent to the tool.

The controller C controls a relative movement position of the pin 11 with respect to the shoulder 12 to operate the tool 1 so as to conform to each of a welding stage (FIG. 4), a discharge stage (FIG. 5), and an oil supply stage (FIG. 6). In the welding stage, friction-stir welding operation as the shoulder preceding process illustrated in FIG. 2 is executed for the tool 1. In the discharge stage, forced discharge operation of the contaminated oil agent 7 from the interlayer 1A is executed. In the oil supply stage, supply operation of the fresh oil agent 7 to the interlayer 1A is executed. Hereinafter, operation of each stage will be described.

<Welding Stage>

FIG. 4 is also a cross-sectional view illustrating a state of the tool 1 in the welding stage. In the welding stage, the controller C executes control (first operation control) for relatively moving the pin 11 with respect to the shoulder 12 in a state where the oil agent 7 is held in the interlayer 1A. That is, the pin 11 is moved up and down within a range in which the first seal portion 1B and the second seal portion 1C are maintained.

Specifically, from the basic state of the tool 1, the controller C relatively moves the lower end portion 11T of the pin 11 with respect to the shoulder 12 in a range of a first pull-up amount S1 from the tip opening 12A. The first pull-up amount S1 is not only shorter than the first seal length L1 but also shorter than the second seal length L2. That is, in the welding stage, the controller C relatively moves the pin 11 with respect to the shoulder 12 so as to satisfy a relationship of Formula (1) below.

$$S1<L2<L1 \quad (1)$$

Moving up of the pin 11 in the process P12 illustrated in FIG. 2 is executed in a range of the first pull-up amount S1. By the above, when the pin 11 is moved up to maximum, the first seal portion 1B and the second seal portion 1 are maintained. Therefore, if the friction-stir welding operation is executed with the tool 1 facing upward, the oil agent 7 does not leak from the interlayer 1A. That is, the oil agent 7 is held in the interlayer 1A between the first seal portion 1B and the second seal portion 1C.

A powder piece 8 is shown in the oil agent 7 of FIG. 4. As described above, the powder piece 8 is an agglomerated piece generated as powder generated when the tool 1 is press-fitting into the overlapping portion 30 is trapped in the interlayer 1A and deposited. The powder pieces 8 deposited in the oil agent 7 tend to increase as the number of welding points in the welding stage increases. When the powder piece 8 adheres to the tip outer peripheral surface 51S of the pin 11, a moving load of the pin 11 becomes high, and the tool 1 may malfunction. Therefore, when the number of welding points at which the powder piece 8 is assumed to reach a considerable amount is exceeded, it is desirable to discharge the oil agent 7 containing the powder piece 8 from the interlayer 1A and to supply the new oil agent 7 to the interlayer 1A. For this purpose, the discharge stage described below is executed, and then the oil supply stage is executed.

<Discharge Stage>

FIG. 5 is a cross-sectional view illustrating a state of the tool 1 in the discharge stage. In the discharge stage, the controller C executes control (second operation control) for relatively moving the pin 11 with respect to the shoulder 12 so that the oil agent 7 is discharged from the interlayer 1A to the outside through the tip opening 12A of the shoulder 12. That is, the tip opening 12A substantially sealed by the first seal portion 1B is opened, and the oil agent 7 held in the intermediate hollow part 12H is discharged to the outside through the tip hollow part 12B and the tip opening 12A. At this time, the controller C operates the blowing device 25 to supply airflow F for promoting discharge of the oil agent 7 into the supply chamber 67.

In the discharge stage, the controller C moves up the pin 11 until the first seal portion 1B and the second seal portion 1C are released. Specifically, the controller C relatively moves the lower end portion 11T of the pin 11 upward with respect to the shoulder 12 from the tip opening 12A by a second pull-up amount S2 (S1<S2) larger than the first pull-up amount S1. The second pull-up amount S2 is larger than the first seal length L1 of the first seal portion 1B. As described above, since the first pull-up amount S1 is smaller than the first seal length L1, a relationship between the pull-up amounts S1 and S2 and the first seal length L1 is as follows:

$$S1<L1<S2 \tag{2}$$

The controller C relatively moves the pin 11 with respect to the shoulder 12 so as to satisfy the relationship of Formula (2).

Furthermore, the second seal length L2 of the second seal portion 1C is smaller than the first seal length L1. Therefore, a relationship including the second seal length L2 in Formula (2) above is as follows:

$$S1<L2<L1<S2 \tag{3}$$

As is clear from the relationship of Formula (3), when the pin 11 is moved up by the second pull-up amount S2, the first seal portion 1B and the second seal portion 1C are released. That is, the small diameter portion 51 of the pin 11 comes out upward from the tip portion 61 of the shoulder 12, and the first seal portion 1B formed by the tip outer peripheral surface 51S and the tip inner peripheral surface 61S facing each other with a narrow clearance is no longer established. Further, since the base end outer peripheral surface 53S of the large diameter portion 53 comes out upward from the intermediate inner peripheral surface 62S of the intermediate portion 62, the second seal portion 1C is also no longer established. By the above, the interlayer 1A holding the oil agent 7 communicates with the outside through the tip opening 12A, and also communicates with the supply chamber 67 through a gap between the intermediate outer peripheral surface 52S and the intermediate inner peripheral surface 62S.

Moving up the pin 11 by the second pull-up amount S2 also leads to operation of sealing the supply chamber 67. The supply chamber 67 is a space defined by the shoulder base 65 and the base end portion 63, and is a space that can communicate with the intermediate hollow part 12H below the supply chamber 67, that is, a space that can communicate with the interlayer 1A. Further, the supply chamber 67 is a space for which sealing and releasing of the sealing can be performed. As height positions of the annular projecting portion 59 (air seal portion) on the pin 11 side and the ridge 66 (air seal portion) on the shoulder 12 side are aligned, and a blowing nozzle 27 is inserted into the introduction port 64, sealing is substantially performed. The supply chamber 67 is opened in the welding stage illustrated in FIG. 4, but is sealed in the discharge stage illustrated in FIG. 5. This is for causing the airflow F to be directed exclusively toward the interlayer 1A.

As illustrated in FIGS. 4 and 5, the second pull-up amount S2 corresponds to a height difference between the annular projecting portion 59 and the ridge 66 in the basic state of the tool 1. Therefore, when the pin 11 is moved up by the second pull-up amount S2, height positions of the annular projecting portion 59 and the ridge 66 are aligned, and an air seal portion ID is formed. That is, the annular projecting portion 59 and the ridge 66 are air seal portions that bring the supply chamber 67 into a sealed state when a relative position of the pin 11 with respect to the shoulder 12 reaches a predetermined position (sealing position) in the axial direction. The controller C constructs the air seal portion by relatively moving the pin 11 by the second pull-up amount S2 from the basic state of the tool 1.

The blowing device 25 includes the blowing nozzle 27 that injects the airflow F. The tool 1 is moved to a waste liquid port for collecting the oil agent 7 including the powder piece 8, for example, when the discharge stage is executed. The blowing device 25 is arranged in the vicinity of the waste liquid port, and when the tool 1 is positioned at a predetermined position of the waste liquid port, the blowing nozzle 27 mounted on a moving mechanism is inserted into the introduction port 64. After the above, the controller C operates the blowing device 25 to supply the airflow F from the blowing nozzle 27 into the supply chamber 67.

As described above, the supply chamber 67 is sealed by the air seal portion and communicates with the intermediate hollow part 12H in which the interlayer 1A is formed. For this reason, the airflow F enters the intermediate hollow part 12H and presses the oil agent 7 existing in the interlayer 1A. Since the tip opening 12A is in an open state, pressing force of the airflow F acts to push out the oil agent 7 to the outside. Therefore, the oil agent 7 containing the powder piece 8 is forcibly discharged to the outside from the interlayer 1A through the tip opening 12A. With assistance of the airflow F, it is possible to quickly discharge the oil agent 7 from the tool 1 as compared with a case of discharging depending only on gravity.

<Oil Supply Stage>

FIG. 6 is a cross-sectional view illustrating a state of the tool 1 in the oil supply stage. In the oil supply stage, the controller C relatively moves the pin 11 to a position where the oil agent 7 can be supplied from the supply chamber 67 to the interlayer 1A. That is, the controller C relatively moves the pin 11 upward with respect to the shoulder 12 so that the supply chamber 67 and the interlayer 1A communicate with each other by releasing the second seal portion 1C while maintaining the first seal portion 1B. Furthermore, the controller C operates the oil supply device 26 to supply the fresh oil agent 7 to the interlayer 1A through the supply chamber 67.

Specifically, the controller C relatively moves the lower end portion 11T of the pin 11 upward with respect to the shoulder 12 from the tip opening 12A by a third pull-up amount S3. The third pull-up amount S3 is set to be smaller than the first seal length L1 of the first seal portion 1B. For this reason, the first seal portion 1B is maintained. On the other hand, the third pull-up amount S3 is set to be larger than the second seal length L2 of the second seal portion 1C. For this reason, the second seal portion 1C is released. That is, a relationship between the third pull-up amount S3 and the seal lengths L1 and L2 is as follows:

$$L2<S3<L1 \quad (4).$$

The oil supply device 26 includes an oil supply nozzle 28 that discharges supply oil 70 for supplying the oil agent 7. The tool 1 is moved to an oil supply port for supplying the fresh oil agent 7, for example, when the oil supply stage is executed. The oil supply device 26 is arranged in the vicinity of the oil supply port, and when the tool 1 is positioned at a predetermined position of the oil supply port, the oil supply nozzle 28 mounted on a moving mechanism is inserted into the introduction port 64. After the above, the controller C operates the oil supply device 26 to supply the supply chamber 67 with the supply oil 70 from the oil supply nozzle 28.

Since the pin 11 is in a state of being moved up by the third pull-up amount S3 satisfying Formula (4) above, a passage for the supply oil 70 is formed on the upper end side of the interlayer 1A. That is, the supply oil 70 discharged from the oil supply nozzle 28 enters the interlayer 1A through a gap between a surface of the second tapered portion 55 of the pin 11 and the intermediate inner peripheral surface 62S. On the other hand, since the first seal portion 1B on the lower end side of the interlayer 1A functions, the supplied oil agent 7 does not leak from the tip opening 12A. Therefore, the fresh oil agent 7 can be newly held in the interlayer 1A.

Advantage of First Embodiment

According to the friction-stir spot welding device M including the tool 1 of the first embodiment and a method for operating the friction-stir spot welding device M, since the oil agent 7 is interposed between the interlayer 1A between the pin 11 and the shoulder 12, the tool 1 can be a structure to which the powder piece 8 of an object to be welded is less likely to adhere inherently. Further, in the welding stage, the pin 11 is relatively moved in a range of the first pull-up amount S1 in which a state in which the oil agent 7 is held in the interlayer 1A can be maintained, that is, in a range in which the first seal portion 1B and the second seal portion 1C can be maintained. For this reason, it is possible to prevent increase in an operation load of the tool 1 at the time of friction-stir welding.

On the other hand, in the discharge stage, the pin 11 is relatively moved by the second pull-up amount S2 at which the first seal portion 1B and the second seal portion 1C are released. By the above, the oil agent 7 containing the powder piece 8 is discharged from the interlayer 1A through the tip opening 12A. That is, it is possible to discharge a dirty oil agent containing the powder piece 8 from the tool 1 only by causing the pin 11 to execute operation of relative movement of the pull-up amounts S1 and S2. Therefore, adhesion of the powder piece 8 to the pin 11 and the shoulder 12 can be prevented without particularly complicating a structure of the tool 1.

Furthermore, inclusion of a shape in which an outer diameter of the pin 11 gradually decreases toward the lower end portion 11T restricts entry of the powder piece 8 into the interlayer 1A between the intermediate outer peripheral surface 52S of the pin 11 and the intermediate inner peripheral surface 62S of the shoulder 12. In the basic state of the tool 1 illustrated in FIG. 4, a relatively large space exists between the intermediate inner peripheral surface 62S and the tip outer peripheral surface 51S of the pin 11 in the vicinity of the lower side of the intermediate hollow part 12H. For this reason, the powder piece 8 made from an agglomerate of powder of a member to be welded trapped by the pin 11 mainly grows in the vicinity of the lower side in the intermediate hollow part 12H. On the other hand, width of the interlayer 1A is narrow above the intermediate hollow part 12H, and the grown powder pieces 8 hardly enter. For this reason, even when the powder piece 8 is generated, a lubricating state of the interlayer 1A is maintained. In this case, the powder piece 8 easily adheres to the vicinity of the first tapered portion 54 of the pin 11, but if the lubricating state of the interlayer 1A is maintained, the adhered powder piece can be easily peeled off with small external force.

Further, in the discharge stage, the airflow F generated by the blowing device 25 applies pressing force to the oil agent 7 in the interlayer 1A, so that the oil agent 7 can be quickly discharged from the tool 1. At this time, when the pin 11 is moved up by the second pull-up amount S2, an air seal portion that seals the supply chamber 67 is formed. Therefore, pressing force of the airflow F easily acts on the oil agent 7 in the interlayer 1A, and the oil agent 7 can be discharged more quickly. Further, since the supply chamber 67 can be sealed only by relative movement of the pin 11, mechanism operation can also be simplified. Also in the oil supply stage, the supply chamber 67 and the interlayer 1A can communicate with each other in a state where the first seal portion 1B is maintained only by relative movement of the pin 11, and a state in which the oil agent 7 can be supplied from the oil supply device 26 to the interlayer 1A can be formed. Therefore, operation of supplying an oil agent to the interlayer 1A can be simplified.

Second Embodiment of Tool

Figure 7B:
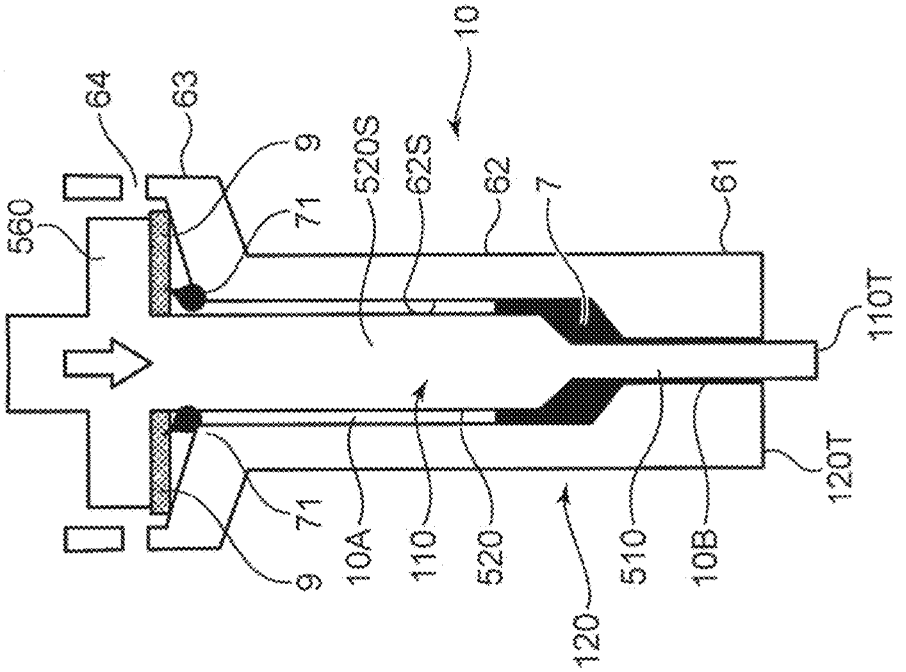
FIG. 7A and FIG. 7B are cross-sectional views illustrating oil supply operation of the tool according to a second embodiment.
Figure 7A:
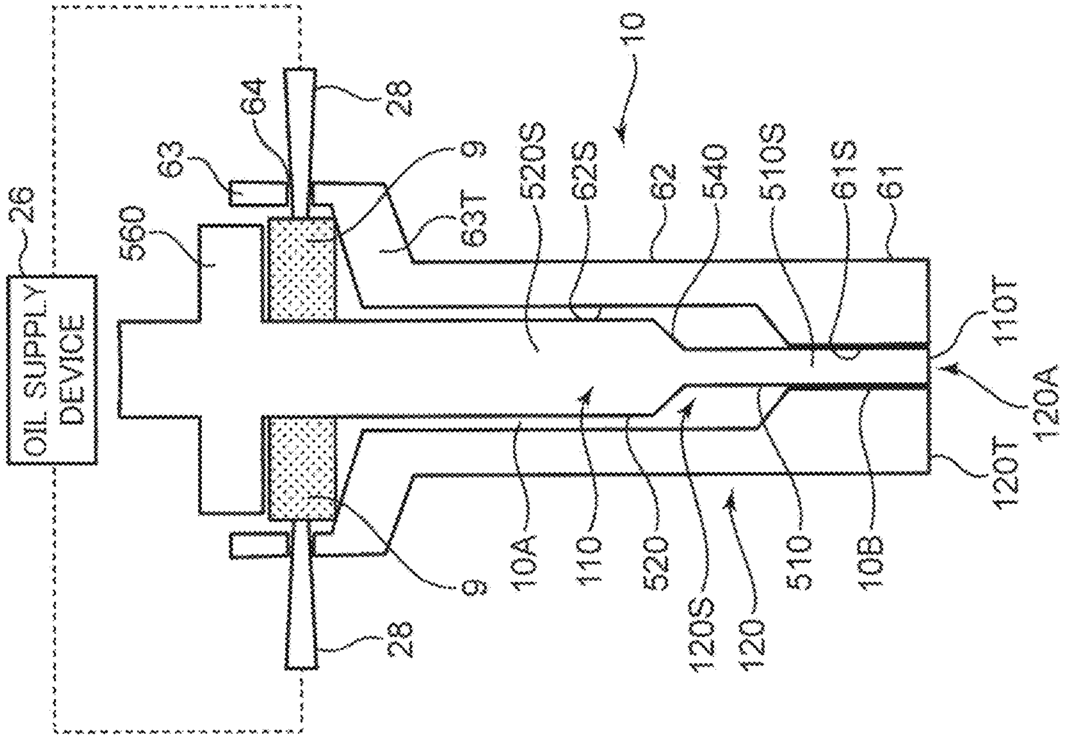

FIG. 7A is a cross-sectional view illustrating a tool 10 according to a second embodiment. In the second embodiment, an example in which an oil containing sponge 9 (elastic oil containing member) is applied instead of the second seal portion 1C included in the tool 1 of the first embodiment will be described.

<Structure of Tool>

The tool 10 includes a pin 110 and the shoulder 12 and the oil containing sponge 9 impregnated with supply oil of the oil agent 7. The pin 110 is formed of a cylindrical body whose diameter decreases in two stages toward a lower end portion 110T, and has a tip small diameter portion 510 and a large diameter portion 520. The tip small diameter portion 510 is a columnar portion having a smallest outer diameter forming a tip portion in the pin 110, and a tip surface of the tip small diameter portion 510 is the lower end portion 110T of the pin 110. The large diameter portion 520 is a columnar portion which is continuous to the upper side of the tip small diameter portion 510 with a tapered portion 540 interposed between them, and has an outer diameter larger than that of the tip small diameter portion 510. The flange portion 56 is provided in the vicinity of an upper end of the large diameter portion 520.

The shoulder 120 is formed of a cylindrical body having a hollow part 120S capable of accommodating the pin 110, and has the tip portion 61, the intermediate portion 62, the base end portion 63, and the introduction port 64 similar to those of the first embodiment. A tip outer peripheral surface 510S of the tip small diameter portion 510 and the tip inner peripheral surface 61S of the tip portion 61 of the shoulder 12 face each other with a clearance that does not allow the oil agent 7 to pass through. In a basic state of the tool 10 in which the lower end portion 110T of the pin 110 and a lower end portion 120T of the shoulder 120 are flush with each other, the tip outer peripheral surface 510S and the tip inner peripheral surface 61S form a tip seal portion 10B.

A large part of the large diameter portion 520 of the pin 110 and an upper portion of the tip small diameter portion 510 are in a state of being accommodated in the hollow part 120S of the shoulder 120 in the basic state. Between the tip outer peripheral surface 510S and a base end outer peripheral surface 520S of the pin 110 and the intermediate inner peripheral surface 62S of the intermediate portion 62 of the shoulder 12, there is an interlayer 10A for holding the oil agent 7.

The oil containing sponge 9 is an elastic body having voids for holding the oil agent 7, and has an annular shape surrounding the large diameter portion 520 immediately below the flange portion 56. Instead of the oil containing sponge 9, another elastic body capable of holding the oil agent 7, for example, an oil containing annular body made from glass wool can also be used. The oil agent 7 is supplied from the oil supply device 26 to the oil containing sponge 9. An outer surface of the oil containing sponge 9 faces the introduction port 64 opened in the base end portion 63. The oil agent 7 is supplied to the oil containing sponge 9 from the oil supply nozzle 28 inserted into the introduction port 64. The oil containing sponge 9 is fixed to the pin 110 and follows upward and downward movement of the pin 110.

A lower surface of the oil containing sponge 9 is in contact with an inner wall surface of the tapered portion 63T of the shoulder 120. That is, the oil containing sponge 9 functions as a seal member that seals an upper surface opening of the hollow part 120S. The interlayer 10A is sealed by being sandwiched between the oil containing sponge 9 on the upper end side and the tip seal portion 10B on the lower end side. Therefore, not only in a case where a tip opening 120A is directed downward in the welding stage, but also when the tool 10 is used in a posture in which the tip opening 120A is directed upward, the oil agent 7 does not leak from the interlayer 10A.

FIG. 7B is a cross-sectional view illustrating oil supply operation of the tool 10. When the oil agent 7 is supplied to the interlayer 10A, the pin 110 is moved downward relative to the shoulder 120 such that the lower end portion 110T of the pin 110 projects further than the lower end portion 12T of the shoulder 120. Due to this downward movement, a flange portion 560 (compressing portion) integrated with the pin 110 compresses the oil containing sponge 9 so as to crush it. By the compression, an oil droplet 71 is squeezed out from the oil containing sponge 9 and supplied to the interlayer 10A. Note that in the shoulder preceding process illustrated in FIG. 2, there is no operation of projecting the lower end portion 110T of the pin 110 from the tip opening 120A, and the operation is performed only at the time of oil supply.

<Operation of Tool>

Figures 8A, 8B, 8C:
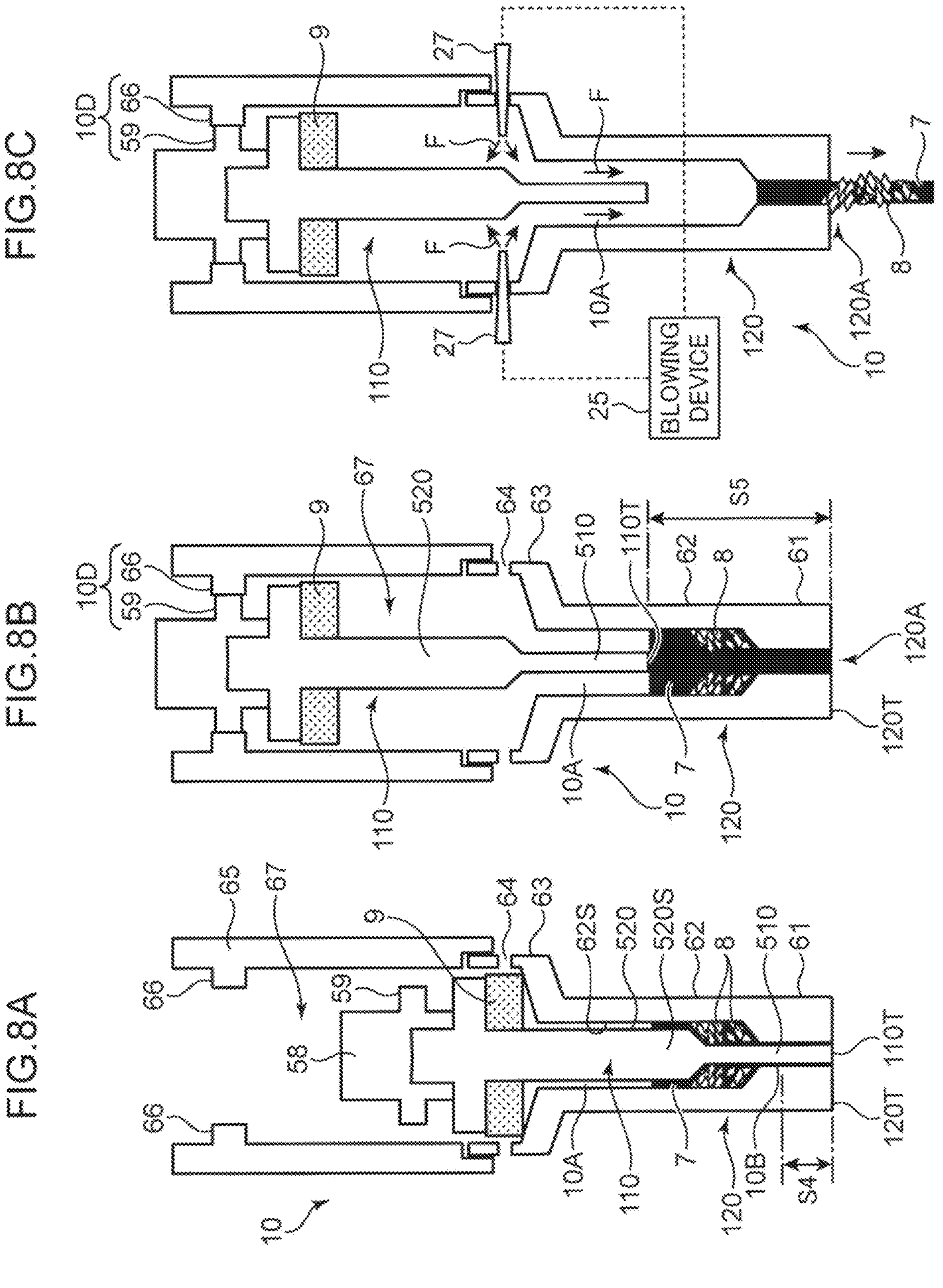
FIG. 8A is a cross-sectional view illustrating a welding stage by the tool according to the second embodiment.
FIG. 8B and FIG. 8C are cross-sectional views illustrating a discharge stage of an oil agent.

Next, operation of the tool 10 of the second embodiment will be described with reference to FIGS. 8A to 8C. Note that operation of the oil supply stage is as illustrated in FIG. 7B above, and thus is omitted here. FIG. 8A is a cross-sectional view illustrating a state of the tool 10 in the welding stage. The controller C relatively moves the lower end portion 110T of the pin 110 with respect to the shoulder 120 in a range of a predetermined pull-up amount S4 from the tip opening 12A from the basic state of the tool 10. The pull-up amount S4 is in a range smaller than a seal length of the tip seal portion 10B.

The pull-up amount S4 may be set in a range in which sealing of an upper surface opening of the hollow part 120S by the oil containing sponge 9 is not released, or may be set in a range in which the sealing is released. In the second embodiment, the oil agent 7 can be supplied by appropriately executing the compressing operation illustrated in FIG. 7B without moving the tool 10 to an oil supply port or the like. For this reason, if the clearance of the interlayer 10A is reduced, lubricity is easily maintained. Therefore, it is possible to set a clearance in which the oil agent 7 does not easily pass through the interlayer 10A, and the interlayer 10A itself can be used as a seal on the upper end side. In such a case, the pull-up amount S4 may be set to a height at which the oil containing sponge 9 is separated from the tapered portion 63T.

When the number of welding points of the tool 10 in the welding stage becomes large, the powder pieces 8 are accumulated in the oil agent 7. For this reason, a discharge stage similar to that of the first embodiment is executed. FIGS. 8B and 8C are cross-sectional views sequentially illustrating a state of the tool 10 in the discharge stage. As illustrated in FIG. 8B, the controller C relatively moves the pin 110 with respect to the shoulder 120 so that the oil agent 7 is discharged from the interlayer 10A to the outside through the tip opening 120A. A pull-up amount S5 in the discharge stage is a height at which the tip seal portion 10B is released, and is a height at which the annular projecting portion 59 and the ridge 66 are at the same height position to form the air seal portion ID.

Subsequently, as illustrated in FIG. 8C, the blowing nozzle 27 of the blowing device 25 is inserted into the introduction port 64. By the above, the supply chamber 67 is in a sealed state. The controller C operates the blowing device 25 to supply the airflow F from the blowing nozzle 27 into the supply chamber 67. Due to pressing force of the airflow F, the oil agent 7 in the interlayer 10A containing the powder piece 8 is discharged to the outside through the tip opening 120A.

According to the friction-stir spot welding device M including the tool 10 of the second embodiment, the oil containing sponge 9 is compressed at an appropriate timing by relative movement of the pin 110 with respect to the shoulder 120, and an oil agent can be supplied to the interlayer 10A. For this reason, the frequency of moving the tool 10 to an oil supply port or the like can be reduced, and oil can be supplied frequently. Further, the oil containing sponge 9 can serve as a sealing material for sealing the interlayer 10A. Therefore, in a case where the tool 10 takes a posture in which the tip opening 120A is directed upward, it is possible to prevent leakage of the oil agent 7 from the interlayer 10A.

Summary of Present Disclosure

The specific embodiment described above includes disclosure having a configuration below.

A friction-stir spot welding device according to an aspect of the present disclosure includes a friction-stir spot welding tool including a pin, a shoulder having a hollow part into which the pin is inserted, and an oil agent interposed in an interlayer between an outer peripheral surface of the pin and an inner peripheral surface of the shoulder, and a control unit of the tool, in which the control unit executes first operation control of relatively moving the pin with respect to the shoulder in a state where the oil agent is held in the interlayer, and second operation control of relatively moving the pin with respect to the shoulder so that the oil agent is discharged from the interlayer to outside through a tip opening of the hollow part.

A method for operating a friction-stir spot welding device according to another aspect of the present disclosure is a method for operating a friction-stir spot welding device including a pin, a shoulder having a hollow part into which the pin is inserted, and an oil agent interposed in an interlayer between an outer peripheral surface of the pin and an inner peripheral surface of the shoulder, the method including relatively moving the pin with respect to the shoulder in a state where the oil agent is held in the interlayer when friction-stir welding is performed, and relatively moving the pin with respect to the shoulder so that the oil agent is discharged from the interlayer to outside through a tip opening of the hollow part when the oil agent is discharged from the interlayer.

According to the friction-stir spot welding device and the method for operating the friction-stir spot welding device, since the oil agent is interposed in the interlayer between the pin and the shoulder, the tool can be a structure to which a powder piece of an object to be welded is less likely to adhere. Further, in the first operation control, the pin relatively moves in a state where the oil agent is held in the interlayer, so that it is possible to prevent increase in an operation load of the tool at the time of friction-stir welding. Furthermore, although the oil agent is interposed, powder pieces of an object to be welded may be deposited in the oil agent in the interlayer when the number of welding points increases. In view of the above, in the second operation control, the oil agent is discharged from the interlayer through the tip opening. That is, the oil agent containing the powder piece can be discharged from the tool only by causing the pin to execute operation of the relative movement. Therefore, adhesion of the powder piece to the tool can be prevented without particularly complicating the structure.

The friction-stir spot welding device described above may further include a blowing device that supplies airflow that promotes discharge of the oil agent in the interlayer, in which the control unit may operate the blowing device in the second operation control.

According to this friction-stir spot welding device, it is possible to forcibly discharge an oil agent containing a powder piece from the interlayer by pressing force of airflow generated by the blowing device. Therefore, the oil agent can be quickly discharged from the tool.

In the friction-stir spot welding device, the tool desirably has a first oil seal portion that is formed with a first seal length L1 in an axial direction of the tool from the tip opening, and in which an outer peripheral surface of the pin and an inner peripheral surface of the shoulder face each other with a clearance that does not substantially allow the oil agent to pass through, and the control unit desirably relatively moves the pin from the tip opening with respect to the shoulder by a first pull-up amount S1 in the first operation control, relatively moves the pin from the tip opening with respect to the shoulder by a second pull-up amount S2 larger than S1 in the second operation control, and executes the relative movement so as to satisfy a relationship of S1<L1<S2.

According to this friction-stir spot welding device, at the time of the first operation control for performing friction-stir welding, the pin is relatively moved with respect to the shoulder in a relationship of S1<L1, so that a sealing function of the first oil seal portion is maintained, and a state in which the oil agent is held in the interlayer can also be maintained. On the other hand, at the time of the second operation control for discharging the oil agent, the pin is relatively moved with respect to the shoulder in a relationship of L1<S2, so that the first oil seal portion is eliminated. Therefore, the oil agent in the interlayer can be discharged from the tip opening.

In the friction-stir spot welding device described above, the tool may further include a second oil seal portion that is formed with a second seal length L2 shorter than the first seal length L1 in the axial direction of the tool and in which an outer peripheral surface of the pin and an inner peripheral surface of the shoulder face each other with a clearance that does not substantially allow the oil agent to pass through, and the control unit may cause an oil agent to be held in the interlayer between the first oil seal portion and the second oil seal portion in the first operation control, release the first oil seal portion and the second oil seal portion by the relative movement with the second pull-up amount S2 so as to supply airflow to the interlayer from the blowing device in the second operation control, and execute the relative movement so as to satisfy a relationship of S1<L2<L1<S2.

According to this friction-stir spot welding device, airflow is applied to the interlayer from the blowing device in the second operation control for discharging the oil agent. The airflow acts to push the oil agent existing in the interlayer to the outside. Therefore, the oil agent can be efficiently discharged from the tip opening of the tool.

In the friction-stir spot welding device, the tool may include a supply chamber capable of communicating with the interlayer and for which sealing and releasing of the sealing are allowed, and an air seal portion that brings the supply chamber into a sealed state when a relative position of the pin with respect to the shoulder reaches a predetermined sealing position in the axial direction of the tool, and the control unit may relatively move the pin to the sealing position in the second operation control to seal the supply chamber in a state of communicating with the interlayer.

According to this friction-stir spot welding device, the supply chamber is sealed by the air seal portion when the second operation control is executed. That is, since the supply chamber can be sealed only by relative movement of the pin, mechanism operation in the second operation control can be simplified.

The friction-stir spot welding device described above may further include an oil supply device that supplies an oil agent to the interlayer, in which the control unit may maintain the first oil seal portion by the relative movement by a third pull-up amount S3 longer than the second seal length L2 and shorter than the first seal length L1 when an oil agent is supplied by the oil supply device, and release the second oil seal portion to relatively move the pin so that the supply chamber communicates with the interlayer. In this case, the oil supply device desirably supplies the oil agent to the interlayer through the supply chamber.

According to this friction-stir spot welding device, the supply chamber and the interlayer in which the oil agent is to be held can be caused to communicate with each other only by relative movement of the pin, and a state in which the oil agent can be supplied from the oil supply device to the interlayer can be formed. Therefore, operation of supplying the oil agent to the interlayer can be simplified.

The friction-stir spot welding device described above may further include an elastic oil containing member that holds an oil agent supplied to the interlayer, in which at least one of the pin and the shoulder may include a compressing portion capable of compressing the clastic oil containing member, and the control unit may relatively move the pin to a position where the compressing portion compresses the elastic oil containing member when an oil agent is supplied by the elastic oil containing member.

According to this friction-stir spot welding device, the elastic oil containing member can be compressed at an appropriate timing by relative movement of the pin to supply the oil agent to the interlayer. Further, the elastic oil containing member can serve as a sealing material for sealing the interlayer, and leakage of the oil agent from the interlayer can be prevented when the tool takes a posture in which the tip opening is directed upward.

The invention claimed is:

1. A friction-stir spot welding device comprising:

a friction-stir spot welding tool including a pin, a shoulder having a hollow part into which the pin is inserted, and an oil agent interposed in an interlayer between an outer peripheral surface of the pin and an inner peripheral surface of the shoulder; and a control unit of the tool, wherein the control unit executes:

a first operation control of relatively moving the pin with respect to the shoulder in a state where the oil agent is held in the interlayer; and a second operation control of relatively moving the pin with respect to the shoulder so that the oil agent is discharged from the interlayer to outside through a tip opening of the hollow part.

2. The friction-stir spot welding device according to claim 1, further comprising a blowing device that supplies airflow that promotes discharge of the oil agent in the interlayer, wherein the control unit operates the blowing device in the second operation control.

3. The friction-stir spot welding device according to claim 2, wherein the tool has a first oil seal portion that is formed with a first seal length L1 in an axial direction of the tool from the tip opening, and in which the outer peripheral surface of the pin and the inner peripheral surface of the shoulder face each other with a clearance that does not substantially allow the oil agent to pass through, and the control unit relatively moves the pin from the tip opening with respect to the shoulder by a first pull-up amount S1 in the first operation control, relatively moves the pin from the tip opening with respect to the shoulder by a second pull-up amount S2 larger than S1 in the second operation control, and executes the relative movement so as to satisfy a relationship of $S1<L1<S2$.

4. The friction-stir spot welding device according to claim 3, wherein the tool further includes:

a second oil seal portion that is formed with a second seal length L2 shorter than the first seal length L1 in the axial direction of the tool and in which the outer peripheral surface of the pin and the inner peripheral surface of the shoulder face each other with a clearance that does not substantially allow the oil agent to pass through, the interlayer is arranged so as to be sandwiched between the first seal portion and the second seal portion, and the control unit causes the oil agent to be held in the interlayer between the first oil seal portion and the second oil seal portion in the first operation control, releases the first oil seal portion and the second oil seal portion by the relative movement with the second pull-up amount S2 so as to supply airflow to the interlayer from the blowing device in the second operation control, and executes the relative movement so as to satisfy a relationship of $S1<L2<L1<S2$.

5. The friction-stir spot welding device according to claim 4, wherein the tool includes:

a supply chamber capable of communicating with the interlayer and for which sealing and releasing of the sealing are allowed; and an air seal portion that brings the supply chamber into a sealed state when a relative position of the pin with respect to the shoulder reaches a predetermined sealing position in the axial direction of the tool, and the control unit relatively moves the pin to the sealing position in the second operation control to seal the supply chamber in a state of communicating with the interlayer.

6. The friction-stir spot welding device according to claim 4, further comprising an oil supply device that supplies the oil agent to the interlayer, wherein the control unit maintains the first oil seal portion by the relative movement by a third pull-up amount S3 longer than the second seal length L2 and shorter than the first seal length L1 when the oil agent is supplied by the oil supply device, and releases the second oil seal portion to relatively move the pin so that a supply chamber communicates with the interlayer.

7. The friction-stir spot welding device according to claim 6, wherein the oil supply device supplies the oil agent to the interlayer through the supply chamber.

8. The friction-stir spot welding device according to claim 1, further comprising an oil containing sponge that holds the oil agent supplied to the interlayer, wherein at least one of the pin and the shoulder includes a compressing portion capable of compressing the oil containing sponge, and the control unit relatively moves the pin to a position where the compressing portion compresses the oil containing sponge when the oil agent is supplied by the oil containing sponge.

9. A method for operating a friction-stir spot welding device including a pin, a shoulder having a hollow part into which the pin is inserted, and an oil agent interposed in an interlayer between an outer peripheral surface of the pin and an inner peripheral surface of the shoulder, the method comprising:

relatively moving the pin with respect to the shoulder in a state where the oil agent is held in the interlayer when friction-stir welding is performed; and relatively moving the pin with respect to the shoulder so that the oil agent is discharged from the interlayer to outside through a tip opening of the hollow part when the oil agent is discharged from the interlayer.

10. The friction-stir spot welding device according to claim 5, further comprising an oil supply device that supplies the oil agent to the interlayer, wherein the control unit maintains the first oil seal portion by the relative movement by a third pull-up amount S3 longer than the second seal length L2 and shorter than the first seal length L1 when the oil agent is supplied by the oil supply device, and releases the second oil seal portion to relatively move the pin so that the supply chamber communicates with the interlayer.

11. The friction-stir spot welding device according to claim 2, further comprising an oil containing sponge that holds the oil agent supplied to the interlayer, wherein at least one of the pin and the shoulder includes a compressing portion capable of compressing the oil containing sponge, and the control unit relatively moves the pin to a position where the compressing portion compresses the oil containing sponge when the oil agent is supplied by the oil containing sponge.

12. The friction-stir spot welding device according to claim 3, further comprising an oil containing sponge that holds the oil agent supplied to the interlayer, wherein at least one of the pin and the shoulder includes a compressing portion capable of compressing the oil containing sponge, and the control unit relatively moves the pin to a position where the compressing portion compresses the oil containing sponge when the oil agent is supplied by the oil containing sponge.

* * * * *